(12) United States Patent
Kim

(10) Patent No.: US 10,922,000 B2
(45) Date of Patent: Feb. 16, 2021

(54) CONTROLLER, OPERATING METHOD THEREOF, AND MEMORY SYSTEM INCLUDING THE SAME

(71) Applicant: SK hynix Inc., Gyeonggi-do (KR)

(72) Inventor: Do Hyun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/745,837

(22) Filed: Jan. 17, 2020

(65) Prior Publication Data

US 2020/0356289 A1 Nov. 12, 2020

(30) Foreign Application Priority Data

May 10, 2019 (KR) .................. 10-2019-0054906

(51) Int. Cl.
*G06F 3/06* (2006.01)

(52) U.S. Cl.
CPC .......... *G06F 3/0634* (2013.01); *G06F 3/0604* (2013.01); *G06F 3/0659* (2013.01); *G06F 3/0679* (2013.01)

(58) Field of Classification Search
CPC .... G06F 3/0634; G06F 3/0679; G06F 3/0659; G06F 3/0604
See application file for complete search history.

(56) References Cited

U.S. PATENT DOCUMENTS

| 5,491,809 A * | 2/1996 | Coffman | G11C 16/22 365/218 |
| 6,233,178 B1 * | 5/2001 | Krishnamurthy | G11C 16/10 365/185.01 |

FOREIGN PATENT DOCUMENTS

KR  1020180016680  2/2018

* cited by examiner

*Primary Examiner* — Ajay Ojha
(74) *Attorney, Agent, or Firm* — IP & T Group LLP

(57) ABSTRACT

A controller, an operating method thereof and a memory system including the same are disclosed. The operating method of a controller which controls a memory system including a nonvolatile memory device including a plurality of data storage regions, includes receiving a command from a host, determining whether a pre-condition command is included in the command by confirming whether the received command has a reserved area, and switching the memory system to a pre-condition state by performing a secure erase and patterning on the nonvolatile memory device according to the pre-condition command included in the command.

17 Claims, 8 Drawing Sheets

FIG.2A

| System Data | User Data |
|---|---|

FIG.2B

| System Data | 0 | 1 | 2 | 3 |
|---|---|---|---|---|
| | 4 | 5 | 6 | 7 |
| | 8 | 9 | 10 | 11 |
| | 12 | 13 | 14 | 15 |
| | 16 | 17 | 18 | 19 |
| | 20 | 21 | 22 | 23 |

FIG.2C

| System Data | 16 | 39 | 34 | 62 | 8 | 73 | 27 | 79 | 12 | 77 | 28 | 56 | 7 | 23 |
|---|---|---|---|---|---|---|---|---|---|---|---|---|---|---|
| | 81 | 54 | 78 | 19 | 80 | 9 | 46 | 74 | 20 | 50 | 75 | 68 | 29 | 57 |
| | 32 | 10 | 26 | 53 | 40 | 25 | 67 | 1 | 24 | 76 | 0 | 66 | 83 | 43 |
| | 71 | 45 | 3 | 82 | 2 | 72 | 31 | 49 | 44 | 55 | 65 | 60 | 30 | 61 |
| | 17 | 63 | 51 | 18 | 58 | 14 | 64 | 4 | 59 | 47 | 5 | 6 | 48 | 36 |
| | 11 | 70 | 42 | 13 | 37 | 69 | 15 | 33 | 38 | 21 | 41 | 35 | 22 | 52 |

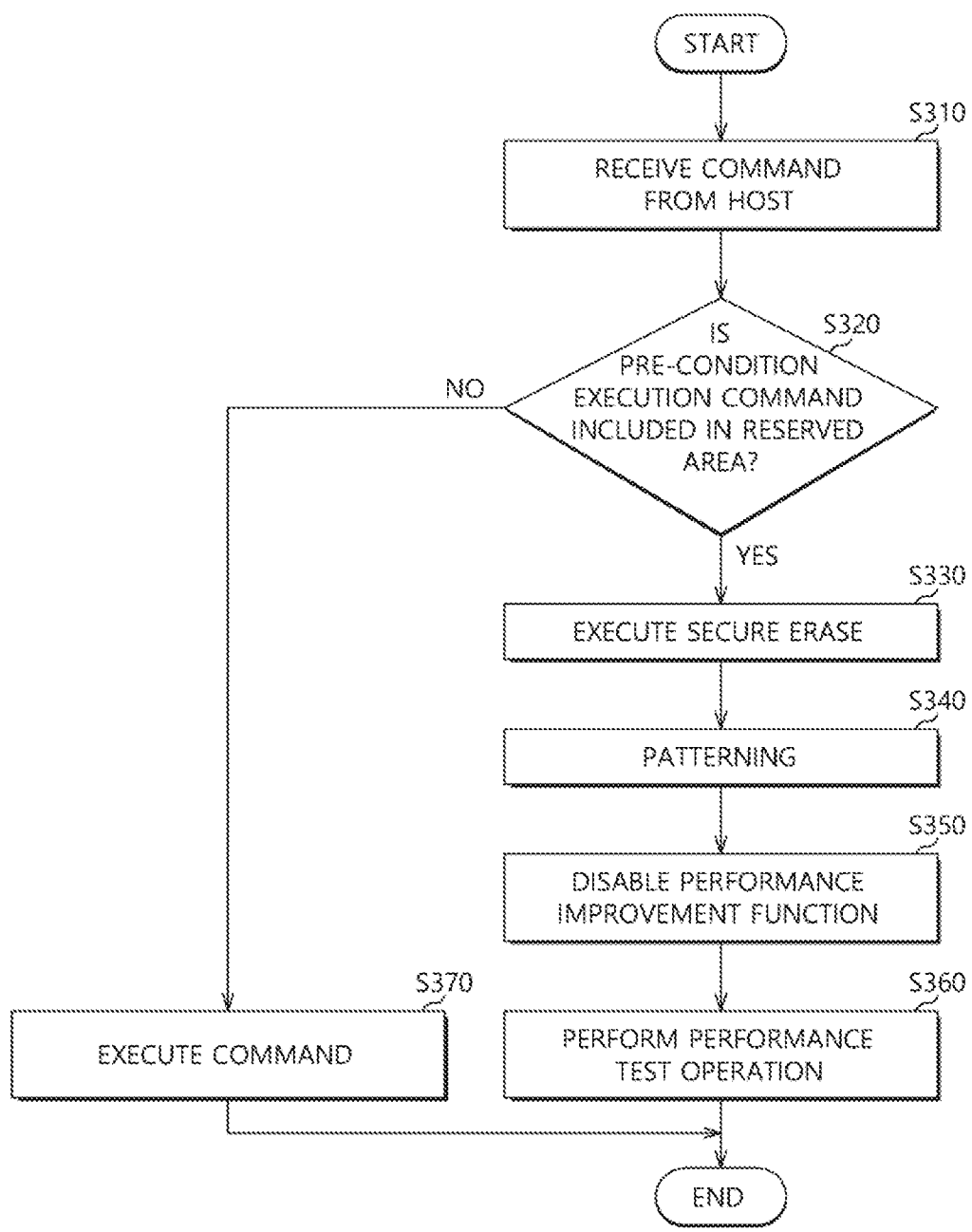

CONTROLLER, OPERATING METHOD THEREOF, AND MEMORY SYSTEM INCLUDING THE SAME

CROSS-REFERENCE TO RELATED APPLICATION

The present application claims priority under 35 U.S.C. § 119(a) to Korean application number 10-2019-0054906, filed on May 10, 2019, in the Korean Intellectual Property Office, which is incorporated herein by reference in its entirety.

BACKGROUND

1. Technical Field

Various embodiments generally relate to a semiconductor device, and more particularly, to a controller, an operating method thereof, and a memory system including the same.

2. Related Art

In recent years, the paradigm for computer environments has shifted to ubiquitous computing in which computer systems may be used anytime and anywhere. As a result, the use of portable electronic apparatuses such as mobile phones, digital cameras, and laptop computers has been increasing rapidly. Generally, portable electronic apparatuses use memory systems that employ memory devices. Memory systems may be used to store data used in the portable electronic apparatuses.

Memory systems using memory devices exhibit good stability and endurance and also have no mechanical driving units, fast information access rate, and low power consumption. Such memory systems may include a universal serial bus (USB) memory device, a memory card having various interfaces, a universal flash storage (UFS) device, a solid state drive (SSD), and the like.

SUMMARY

Embodiments are provided to technology capable of reducing time required for a performance test of a memory system.

In an embodiment of the present disclosure, an operating method of a controller which controls a memory system including a nonvolatile memory device including a plurality of data storage regions, the method may include: receiving a command from a host: determining whether a pre-condition command is included in the command by confirming whether the received command has a reserved area; and switching the memory system to a pre-condition state by performing a secure erase and patterning on the nonvolatile memory device according to the pre-condition command included in the command.

In an embodiment of the present disclosure, a memory system may include: a nonvolatile memory device including a plurality of data storage regions and a controller configured to control the nonvolatile memory device. The controller may determine whether a pre-condition command is included in a received command by confirming whether the received command has a reserved area and the nonvolatile memory device may perform a secure erase and patterning according to the pre-condition command included in the command.

In an embodiment of the present disclosure, an operating method of a controller for controlling a memory device having a plurality of memory blocks, the operating method may include: controlling, in response to a pre-condition command, the memory device to erase all of the memory blocks and store patterns of test data in a storage region, having a size indicated by the pre-condition command, within the memory blocks; and controlling, in response to a test command, the memory device to perform a read operation on the memory blocks storing the patterns of test data.

According to an embodiment of the present disclosure, the time required for a performance test of a memory system may be reduced.

These and other features, aspects, and embodiments are described below.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIGS. 2A to 2C are diagrams explaining an operating method of a memory system according to an embodiment of the present disclosure;

FIG. 3 is a diagram explaining an operating method of a memory system according to an embodiment of the present disclosure;

DETAILED DESCRIPTION

Various embodiments of the present invention are described below in greater detail with reference to the accompanying drawings. Throughout the specification, reference to "an embodiment" or the like is not necessarily to only one embodiment, and different references to any such phrase are not necessarily to the same embodiment(s).

The present invention is described herein in connection with various embodiments. However, the present invention is not limited to any particular embodiment or to any particular details thereof. Rather, it will be appreciated by those of ordinary skill in the art that changes may be made to any of these embodiments without departing from the principles and spirit of the present invention, which encompasses all such changes to the extend they fall within the scope of the claims.

Figure 1:
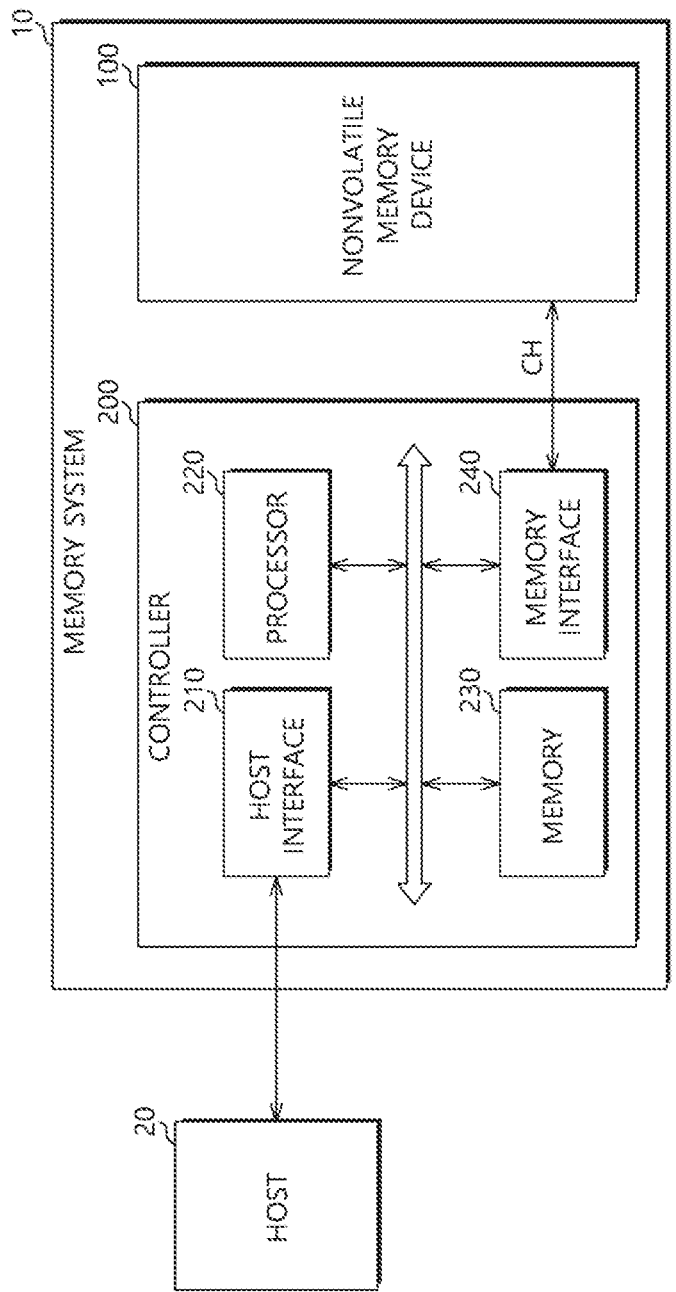
FIG. 1 is a diagram illustrating a configuration of a memory system according to an embodiment of the present disclosure.

FIG. 1 is a diagram illustrating a configuration of a memory system 10 according to an embodiment.

Referring to FIG. 1, the memory system 10 may store data to be accessed by a host 20 such as a mobile phone, an MP3 player, a laptop computer, a desktop computer, a game player, a television (TV), an in-vehicle infotainment system, and the like.

The memory system 10 may be configured as any of various types of storage devices according to an interface protocol coupled to the host 20. For example, the memory system 10 may be configured as a solid state drive (SSD), a multimedia card in the form of MMC, eMMC, RS-MMC, and micro-MMC, a secure digital card in the form of SD, mini-SD, and micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, a memory stick, and/or the like.

The memory system 10 may be manufactured as any of various types of packages. For example, the memory system 10 may be manufactured as a package on package (POP), a system in package (SIP), a system on chip (SOC), a multi-chip package (MCP), a chip on board (COB), a wafer-level fabricated package (WFP), and/or a wafer-level stack package (WSP).

The memory system 10 may include a nonvolatile memory device 100 and a controller 200.

The nonvolatile memory device 100 may be operated as a storage medium of the memory system 10. The nonvolatile memory device 100 may include any of various types of nonvolatile memory devices according to memory cells therein, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and/or a resistive random access memory (ReRAM) using a transition metal compound.

Although it has been illustrated in FIG. 1 that the memory system 10 includes one nonvolatile memory device 100 for clarity, the memory system 10 may include a plurality of nonvolatile memory devices 100 and the present disclosure may be equally applied to the memory system 10 including the plurality of nonvolatile memory devices 100.

The nonvolatile memory device 100, to be described below in detail with reference to FIG. 9, may include a memory cell array 110 including a plurality of memory cells MC arranged in regions in which a plurality of word lines WL1 to WLm and a plurality of bit lines BL1 to BLn cross each other. The memory cell array 110 may include a plurality of memory blocks and each of the plurality of memory blocks may include a plurality of pages.

For example, each of the memory cells in the memory cell array may be a single level cell (SLC) in which a single bit data (for example, 1-bit data) is to be stored or a multi level cell (MLC) in which multiple bits of data are to be stored. That is, an MLC may store two or more bits of data. That said, the term MLC is sometimes reserved for a cell in which two bits of data are to be stored, in which case a memory cell in which three bits of data are to be stored is referred to as a triple level cell (TLC), and a memory cell in which four bits of data are to be stored is referred to as a quadruple level cell (QLC). However, in the description that follows, MLC is used in the more general sense to depict a memory cell in which two or more bits of data are to be stored.

The memory cell array 110 may include one or more SLCs and MLCs. The memory cell array 110 may include memory cells arranged in a two-dimensional (2D) horizontal structure or memory cells arranged in a 3D vertical structure.

The controller 200 may control overall operation of the memory system 10 through driving of firmware or software loaded into a memory 230. The controller 200 may decode and drive a code-type instruction or algorithm such as firmware or software. The controller 200 may be implemented with hardware or a combination of hardware and software.

The controller 200 may include a host interface 210, a processor 220, the memory 230, and a memory interface 240. Although not shown in FIG. 1, the controller 200 may further include an error correction code (ECC) engine which generates a parity by performing ECC encoding on write data provided from the host 20 and performs ECC decoding on data read out from the nonvolatile memory device 100 using the parity.

The host interface 210 may perform interfacing between the host 20 and the memory system 10 according to a protocol of the host 20. For example, the host interface 210 may communicate with the host 20 through any of various protocols including a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and/or a PCI-E protocol.

The processor 220 may be configured of a micro control unit (MCU) and/or a central processing unit (CPU). The processor 220 may process requests transmitted from the host 20. To process the requests transmitted from the host 20, the processor 220 may drive a code-type instruction or algorithm (for example, firmware) loaded into the memory 230 and control internal function blocks such as the host interface 210, the memory 230, and the memory interface 240 and the nonvolatile memory device 100.

The processor 220 may generate control signals for controlling operations of the nonvolatile memory device 100 based on the requests transmitted from the host 20 and provide the generated control signals to the nonvolatile memory device 100 through the memory interface 240.

The memory 230 may be configured of a random access memory such as a dynamic random access memory (DRAM) or a static random access memory (SRAM), The memory 230 may store the firmware driven through the processor 220. The memory 230 may also store data (for example, metadata) for driving the firmware. For example, the memory 230 may be operated as a working memory of the processor 220.

The memory 230 may be configured to include a data buffer configured to temporarily store write data to be transmitted to the nonvolatile memory device 100 from the host 20 or read data to be transmitted to the host 20 from the nonvolatile memory device 100. For example, the memory 230 may be operated as a buffer memory of the processor 220.

The memory interface 240 may control the nonvolatile memory device 100 according to control of the processor 220. The memory interface 240 may refer to a memory controller. The memory interface 240 may provide control signals to the nonvolatile memory device 100. The control signals may include a command, an address, an operation control signal, and the like for controlling the nonvolatile memory device 100. The memory interface 240 may provide data stored in the data buffer to the nonvolatile memory device 100 or store data transmitted from the nonvolatile memory device 100 in the data buffer.

FIG. 2A to FIG. 2C are a diagram explaining an operating method of a memory system according to an embodiment.

Referring to FIG. 2A to FIG. 2C, a system data region (System Data) in which system data for an operation of the memory system 10 is to be stored and a user data region (User Data) in which user data is to be stored are illustrated. FIG. 2A illustrates an initial state as fresh of box (FOB) in which the memory system 10 is initially to be used. The initial state may refer to a clean state just after a secure erase is performed. FIG. 2B illustrates a sequential pattern of test data as a result of a sequential write that is performed on the memory system 10, and FIG. 2C illustrates a random pattern of test data as a result of a random write that is performed on the memory system 10.

Referring to FIG. 2A, since stored data is not preset in an initial state of the memory system 10, a mapping relationship between a logical address and a physical address may not be present. FIG. 2B illustrates the state that the sequential write operation is performed in set size units (each, for example, 128 KB) of the data storage region for the sequential write and read test of the memory system 10. FIG. 2C illustrates the state that the random write operation is performed in set size units (each, for example, 512 B) of the data storage region for a random write and read test of the memory system 10. The numbers illustrated in FIGS. 2B and 2C may refer to an order in which the write operation is performed.

In general, for the performance test of the memory system 10, the memory system 10 has to be in an initial state as illustrated in FIG. 2(A). In order to make the memory system 10 be in the initial state, a secure erase operation on the nonvolatile memory device 100 may be performed. When the nonvolatile memory device 100 is in the initial state, the patterning is performed as illustrated in FIG. 2(B) or FIG. 2(C). For the patterning, the memory system 10 repeatedly performs operations of receiving data from the host 20 and storing the received data in the nonvolatile memory device a large number of times and thus a large amount of time may be necessary for preparing the performance test of the memory system 10.

Accordingly, an embodiment may provide technology capable of reducing the time for preparing the performance test by including a pre-condition execution command, which allows the memory system 10 to perform the preparing operation for the performance test, in the reserved area of a command received from the host 20. The pre-condition may refer to a state that the secure erase and patterning on the memory system 10 have been performed.

FIG. 3 is a diagram explaining an operating method of a memory system according to an embodiment.

Referring to FIG. 3, in operation S310, the memory system 10 may receive a command from the host 20. The command may be a read command or a write command, which is transmitted from the host 20 to the memory system 10.

In an embodiment, the command may be according to a nonvolatile memory express (NVMe) standard. For example, the host 20 may transmit a command (Command DWord) 11 (CDW 11) according to the NVMe standard to the nonvolatile memory device 100. This is because the secure erase operation is included in the command 11.

Table 1 shows the command 11 (CDW 11) of a command format disclosed in the NVMe standard document and Table 2 shows a detailed specification for the command 11.

TABLE 1

| Allocated Bits | Description |
| --- | --- |
| 43: 40 | Command Dword 10 (CDW10): This field is command specific Dword 10. |
| 47: 44 | Command Dword 11 (CDW11): This field is command specific Dword 11. |
| 51: 48 | Command Dword 12 (CDW12): This field is command specific Dword 12. |
| 55: 52 | Command Dword 13 (CDW13): This field is command specific Dword 13. |
| 59: 56 | Command Dword 14 (CDW14): This field is command specific Dword 14. |
| 63: 60 | Command Dword 15 (CDW15): This field is command specific Dword 15. |

TABLE 2

| Allocated Bits | Description |
| --- | --- |
| 31b: 12b | Reserved |
| 11: 09 | Secure Erase Perform secure Erase (Data or encryption key) |
| 08 | Protection Information Location End-to-end protection function activation/inactivation |
| 07: 05 | Protection Information End-to-end protection function information |
| 04 | Metadata Setting Metadata transmission/non-transmission |
| 03: 00 | LBA format Designate item to support among 16 LBA formats |

Table 3 is an example of command 11 using the reserved area of Table 2. In an embodiment, the reserved area of the command 11 may include a data size (for example, block size) in which a pattern programming operation is to be performed, e.g., sequential write/random write, feature off, preconditioning, and the like.

TABLE 3

| Allocated Bits | Description |
| --- | --- |
| 20b: 12b | Reserved |
| 15~19b | Block Size |
| 14 | Sequential/Random |
| 13 | Feature Off |
| 12 | Preconditioning |
| 11: 09 | Secure Erase Perform Secure Erase (Data or Encryption key |
| 08 | Protection Information Location End-to-end protection function activation/inactivation |
| 07: 05 | Protection Information End-to-end protection function information |
| 04 | Metadata Setting Metadata transmission/non-transmission |

Table 4 shows an example of the data size (block size) in Table 3. Referring to Table 4, the data size for performing pattern programming may be represented with 512 Byte to 32 MB using a 15-th bit to a 19-th bit of the reserved region.

TABLE 4

| Bit Order | | | | | |
|---|---|---|---|---|---|
| 19 | 18 | 17 | 16 | 15 | Block Size |
| 0 | 0 | 0 | 0 | 0 | 512 Byte |
| 0 | 0 | 0 | 0 | 1 | 1 KB |
| 0 | 0 | 0 | 1 | 0 | 2 KB |
| 0 | 0 | 0 | 1 | 1 | 4 KB |
| 0 | 0 | 1 | 0 | 0 | 8 KB |
| 0 | 0 | 1 | 0 | 1 | 16 KB |
| 0 | 0 | 1 | 1 | 0 | 32 KB |
| 0 | 0 | 1 | 1 | 1 | 64 KB |
| 0 | 1 | 0 | 0 | 0 | 128 KB |
| 0 | 1 | 0 | 0 | 1 | 256 KB |
| 0 | 1 | 0 | 1 | 0 | 512 KB |
| 0 | 1 | 0 | 1 | 1 | 1 MB |
| 0 | 1 | 1 | 0 | 0 | 2 MB |
| 0 | 1 | 1 | 0 | 1 | 4 MB |
| 0 | 1 | 1 | 1 | 0 | 8 MB |
| 0 | 1 | 1 | 1 | 1 | 16 MB |
| 1 | 0 | 0 | 0 | 0 | 32 MB |
| 1 | 0 | 0 | 0 | 1 | Reserved |

In an embodiment, command 11 may include a bit 12 indicating preconditioning, a bit 13 indicating partial feature off for improving performance of the nonvolatile memory device, a bit 14 indicating whether a pattern programming operation is a sequential write or a random write, and bits 15 to 19 indicating a data size for pattern programming as shown in Table 3.

In operation S320, the memory system 10 may determine whether a pre-condition execution command is included in the command. For example, the controller 200 may confirm whether the pre-condition execution command is included in the reserved area of the command received from the host 20.

In an embodiment, the command received from the host 20 may be a secure erase command. For example, the host 20 may transmit the secure erase command, which includes the pre-condition execution command in the reserved area, to the memory system 10.

In an embodiment, the reserved area of the command may include information for whether the pattern programming is random pattering or sequential patterning.

In an embodiment, the reserved area of the command may include information for size units of a data storage region on which a write operation for performing random pattering or sequential patterning is to be performed.

In operation S330, the memory system 10 may execute the secure erase operation. For example, the controller 200 may control the nonvolatile memory device 100 to perform the secure erase operation when the pre-condition execution command is included in the command received from the host 20 as determined (that is, "YES" at operation S320) in operation S320. The nonvolatile memory device 100 may perform the secure erase operation for the data storage region according to control of the controller 200. Accordingly, the memory system 10 may be in the initial state.

In operation S340, the memory system 10 may perform patterning. For example, the controller 200 may control the nonvolatile memory device 100 to perform patterning on the data storage region when the secure erase operation of the nonvolatile memory device 100 is completed. The nonvolatile memory device 100 may perform the write operation for patterning the data storage region according to control of the controller 200.

In an embodiment, the controller 200 may control the nonvolatile memory device 100 to perform the write operation for sequential patterning when the information for the sequential patterning is included in the reserved area of the command. The nonvolatile memory device 100 may perform the sequential write operation for sequential patterning according to control of the controller 200.

In an embodiment, the controller 200 may control the nonvolatile memory device 100 to perform the write operation for random patterning when the information for the random patterning is included in the reserved area of the command. The nonvolatile memory device 100 may perform the random write operation for random patterning according to control of the controller 200.

In an embodiment, the controller 200 may control the nonvolatile memory device 100 to perform the write operation for patterning in size units of the data storage region when the size information of the data storage region, on which the write operation for patterning is to be performed, is included in the reserved area of the command.

In an embodiment, the controller 200 may control the nonvolatile memory device to perform the write operation for patterning through a burst mode. For example, when first test data for patterning is received from the host 20, the controller 200 may store the received first test data in the data buffer. The controller 200 may transmit the first test data stored in the data buffer to the nonvolatile memory device 100. The nonvolatile memory device may perform the write operation which stores the first test data in a first data storage region. When the write operation which stores the first test data in the first data storage region is completed, the controller 200 may transmit the first test data stored in the data buffer to the nonvolatile memory device 100 again and control the nonvolatile memory device 100 to store the first test data in a second data storage region. The controller 200 may repeatedly perform such an operation until the patterning on all the data storage regions of the nonvolatile memory device 100 is performed. For example, the controller 200 may retain the first test data stored in the data buffer until the pattering on all the data storage regions of the nonvolatile memory device 100 is performed. Accordingly, the time required as the controller repeatedly receives the test data from the host for patterning may be reduced.

In operation S350, the memory system 10 may switch the nonvolatile memory device to a sustained state (for example, feature off state) in which the performance improvement functions for improving input/output performance and the like of the memory system 10 are restricted. For example, the controller 200 may disable the performance improvement functions when the secure erase and patterning are performed according to the pre-condition command.

In an embodiment, the performance improvement function may be for improving write performance of the memory system 10. For example, when data is stored in a data storage region configured of memory cells such as MLC among the data storage regions of the nonvolatile memory device, the performance improvement function may be a memory cache function which allows a data storage region configured of SLC memory cells among the data storage regions of the nonvolatile memory device to be operated as a buffer of the data storage region configured of MLC memory cells.

In an embodiment, the performance improvement function may be for improving read performance of the memory system 10. For example, the performance improvement function may be a cache policy which caches map data in the memory 230 of the controller 200 to improve the read performance of the memory system 10.

In operation S360, the memory system 10 may perform an operation for a performance test according to a request of the host 20. For example, the memory system 10 may store the requested data in the nonvolatile memory device 100 or read data stored in the nonvolatile memory device when the random or sequential test request is received from the host 20.

In operation S370, the memory system 10 may execute the command received from the host 20. For example, when the pre-condition execution command is not included in the command received from the host 20 (that is, "NO" at operation S320) as determined at S320, the controller 200 may not perform the secure erase operation, the patterning operation, and the like and may perform a general operation such as read, write, and the like according to the command received from the host 20.

Figure 4:
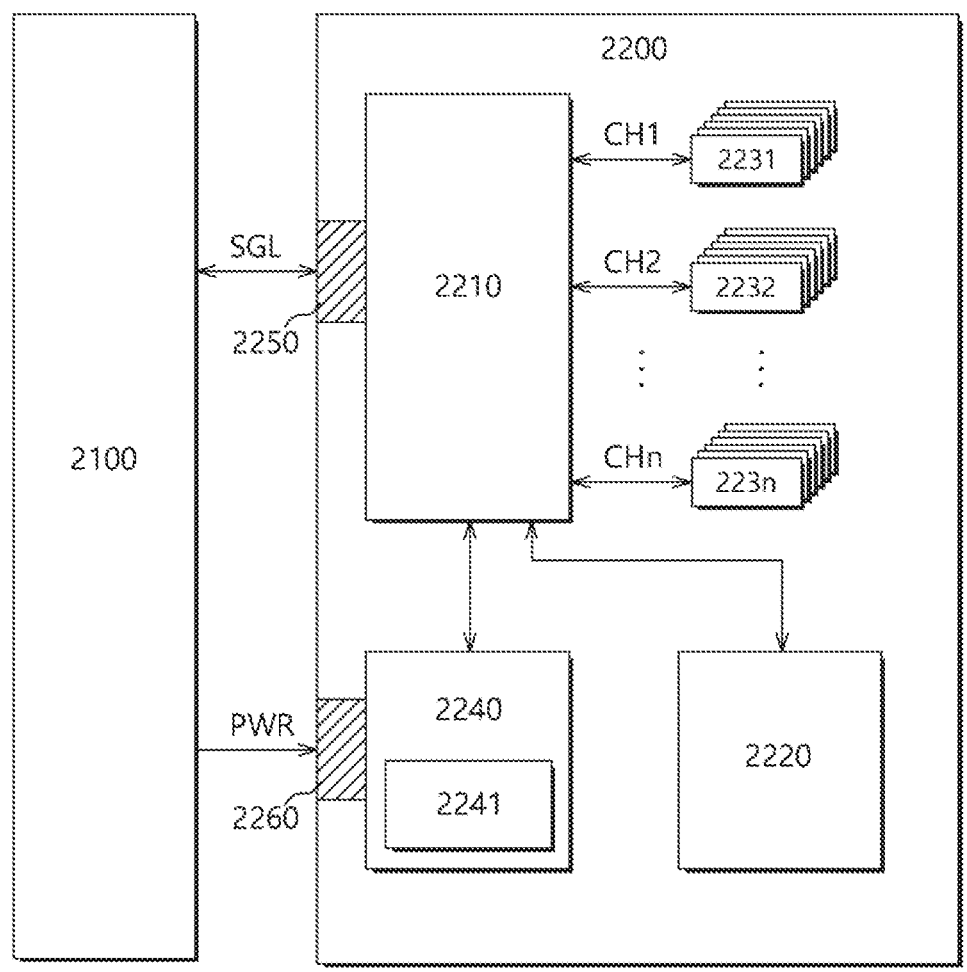
FIG. 4 is a diagram illustrating a data processing system including a solid state drive (SSD) according to an embodiment of the present disclosure.

FIG. 4 is a block diagram illustrating an example of a data processing system including a solid state drive (SSD) according to an embodiment. Referring to FIG. 4, a data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2200.

The buffer memory device 2220 may temporarily store data which are to be stored in the nonvolatile memory devices 2231 to 223n. Further, the buffer memory device 2220 may temporarily store data which are read out from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to the same channel. The nonvolatile memory devices coupled to the same channel may be coupled to the same signal bus and data bus.

The power supply 2240 may provide power PWR inputted through the power connector 2260 to the inside of the SSD 2200. The power supply 2240 may include an auxiliary power supply 2241. The auxiliary power supply 2241 may supply power to allow the SSD 2200 to be properly terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, data, and the like. The signal connector 2250 may be configured as any of various types of connectors according to an interface scheme between the host 2100 and the SSD 2200.

Figure 5:
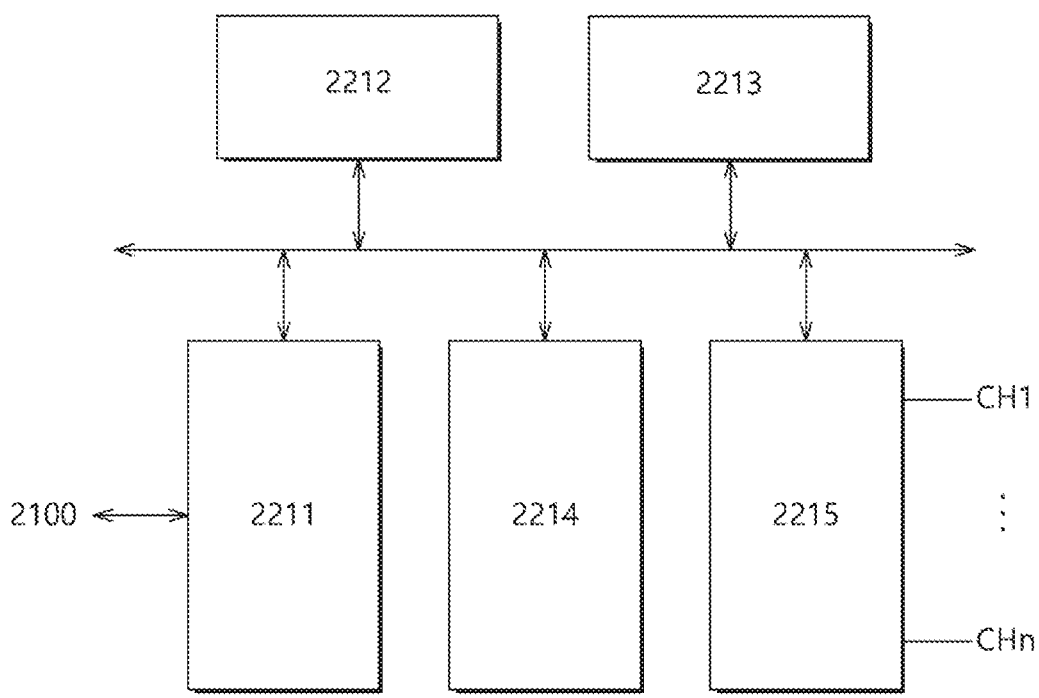
FIG. 5 is a diagram illustrating a configuration of a controller in FIG. 4.

FIG. 5 is a block diagram illustrating an example of the controller illustrated in FIG. 4. Referring to FIG. 5, the controller 2210 may include a host interface 2211, a control component 2212, a random access memory 2213, an error correction code (ECC) component 2214, and a memory interface 2215.

The host interface 2211 may provide interfacing between the host 2100 and the SSD 2200 according to a protocol of the host 2100. For example, the host interface 2211 may communicate with the host 2100 through any among SD, USB, MMC, embedded MMC (eMMC), PCMCIA, PATA, SATA, SCSI, SAS, PCI, PCI-E, and UFS protocols. In addition, the host interface 2211 may perform a disk emulating function of supporting the host 2100 to recognize the SSD 2200 as a general-purpose memory system, for example, a hard disk drive (HDD).

The control component 2212 may analyze and process the signal SGL inputted from the host 2100. The control component 2212 may control operations of internal function blocks according to firmware or software for driving the SSD 2200. The random access memory 2213 may be used as a working memory for driving such firmware or software.

The ECC component 2214 may generate parity data of data to be transmitted to the nonvolatile memory devices 2231 to 223n. The generated parity data may be stored, along with the data, in the nonvolatile memory devices 2231 to 223n. The ECC component 2214 may detect errors of data read out from the nonvolatile memory devices 2231 to 223n based on the parity data. When the detected errors are within a correctable range, the ECC component 2214 may correct the detected errors.

The memory interface 2215 may provide control signals such as commands and addresses to the nonvolatile memory devices 2231 to 223n according to control of the control component 2212. The memory interface 2215 may exchange data with the nonvolatile memory devices 2231 to 223n according to control of the control component 2212. For example, the memory interface 2215 may provide data stored in the buffer memory device 2220 to the nonvolatile memory devices 2231 to 223n or provide data read out from the nonvolatile memory devices 2231 to 223n to the buffer memory device 2220.

Figure 6:
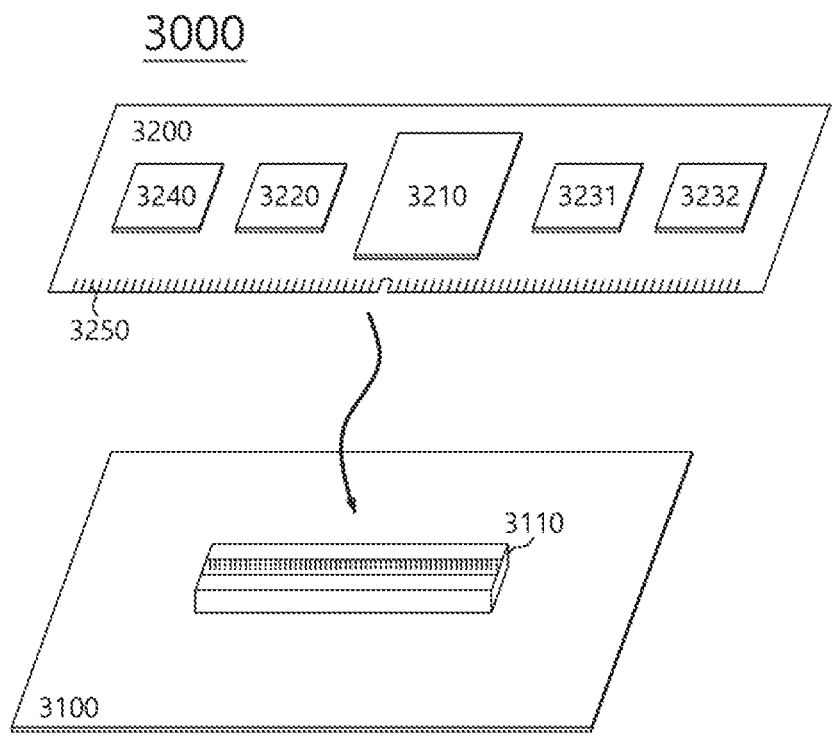
FIG. 6 is a diagram illustrating a data processing system including a memory system according to an embodiment of the present disclosure.

FIG. 6 is a diagram illustrating an example of a data processing system including a memory system according to an embodiment. Referring to FIG. 6, a data processing system 3000 may include a host 3100 and a memory system 3200.

The host 3100 may be configured in the form of a board such as a printed circuit board. Although not shown in FIG. 6, the host 3100 may include internal function blocks for performing functions of the host.

The host 3100 may include a connection terminal 3110 such as a socket, a slot or a connector. The memory system 3200 may be mounted on the connection terminal 3110.

The memory system 3200 may be configured in the form of a board such as a printed circuit board. The memory system 3200 may refer to a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control overall operation of the memory system 3200. The controller 3210 may be configured in the same manner as the controller 2210 shown in FIG. 5.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host 3100. Through the connection terminal 3250, signals such as commands, addresses, data and the like and power may be transferred between the host 3100 and the memory system 3200. The connection terminal 3250 may be configured as any of various types depending on an interface scheme between the host 3100 and the memory system 3200. The connection terminal 3250 may be disposed on or in any side of the memory system 3200.

Figure 7:
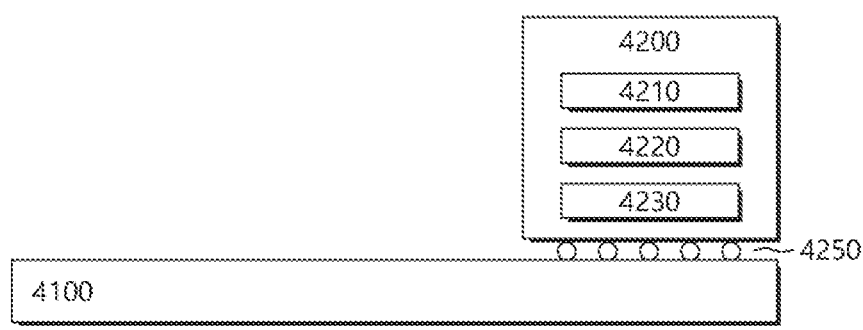
FIG. 7 is a diagram illustrating a data processing system including a memory system according to an embodiment of the present disclosure.

FIG. 7 is a block diagram illustrating an example of a data processing system including a memory system according to an embodiment. Referring to FIG. 7, a data processing system 4000 may include a host 4100 and a memory system 4200.

The host 4100 may be configured in the form of a board such as a printed circuit board. Although not shown in FIG. 7, the host 4100 may include internal function blocks for performing functions of the host.

The memory system 4200 may be configured in the form of a surface-mounting type package. The memory system 4200 may be mounted on the host 4100 through solder balls 4250. The memory system 4200 may include a controller 4210, a buffer memory device 4220, and a nonvolatile memory device 4230.

The controller 4210 may control overall operation of the memory system 4200. The controller 4210 may be configured in the same manner as the controller 2210 shown in FIG. 5.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 8:
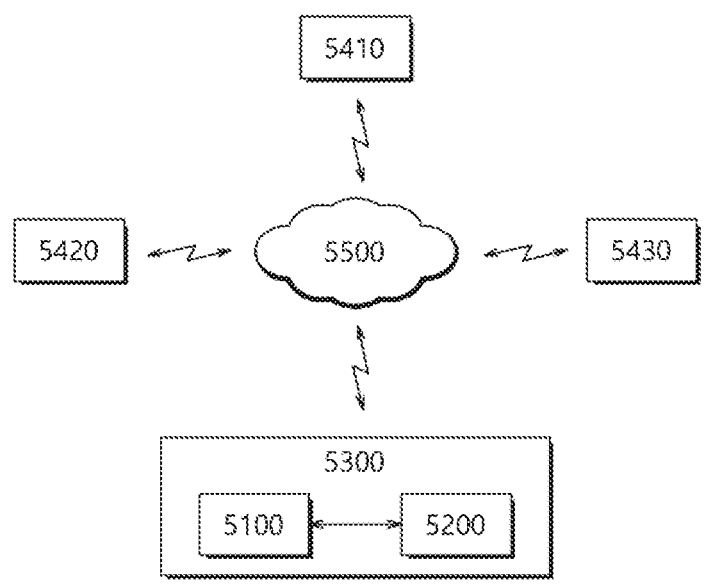
FIG. 8 is a diagram illustrating a network system including a memory system according to an embodiment of the present disclosure.

FIG. 8 is a diagram illustrating an example of a network system 5000 including a memory system according to an embodiment. Referring to FIG. 8, the network system 5000 may include a server system 5300 and a plurality of client systems 5410 to 5430 which are coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured of the memory system 10 illustrated in FIG. 1, the memory system 2200 illustrated in FIG. 4, the memory system 3200 illustrated in FIG. 6, or the memory system 4200 illustrated in FIG. 7.

Figure 9:
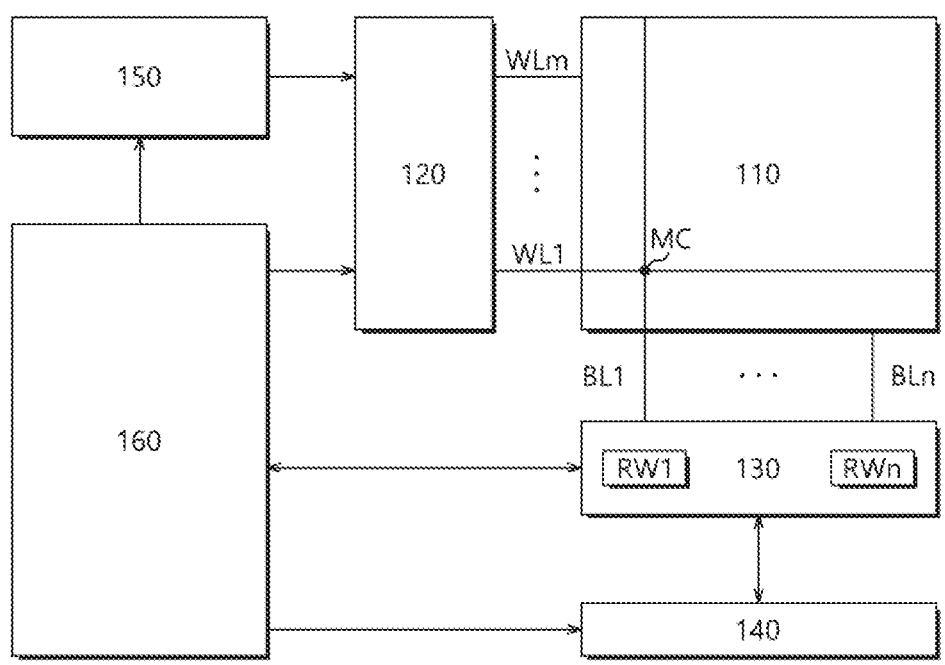
FIG. 9 is a diagram illustrating a nonvolatile memory device included in a memory system according to an embodiment of the preset disclosure.

FIG. 9 is a block diagram illustrating an example of a nonvolatile memory device included in a memory system according to an embodiment. Referring to FIG. 9, the nonvolatile memory device 100 may include the memory cell array 110, a row decoder 120, a data read/write block 130, a column decoder 140, a voltage generator 150, and control logic 160.

The memory cell array 110 may include memory cells MC which are arranged in regions where the word lines WL1 to WLm and the bit lines BL1 to BLn cross each other.

The row decoder 120 may be coupled with the memory cell array 110 through the word lines WL1 to WLm. The row decoder 120 may operate according to control of the control logic 160. The row decoder 120 may decode addresses provided from an external device (not shown). The row decoder 120 may select and drive the word lines WL1 to WLm, based on the decoding results. For example, the row decoder 120 may provide word line voltages provided from the voltage generator 150, to the word lines WL1 to WLm.

The data read/write block 130 may be coupled with the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as a write driver which stores data provided from the external device, in the memory cell array 110 in a write operation. In another example, the data read/write block 130 may operate as a sense amplifier which reads out data from the memory cell array 110 in a read operation.

The column decoder 140 may operate according to control of the control logic 160. The column decoder 140 may decode addresses provided from the external device. The column decoder 140 may couple data input/output lines (or data input/output buffers) with the read/write circuits RW1 to RWn of the data read/write block 130 which respectively correspond to the bit lines BL1 to BLn, based on decoding results.

The voltage generator 150 may generate voltages to be used in internal operations of the nonvolatile memory device 100. The voltages generated by the voltage generator 150 may be applied to the memory cells MC of the memory cell array 110. For example, a program voltage generated in a program operation may be applied to a word line of memory cells on which the program operation is to be performed. In another example, an erase voltage generated in an erase operation may be applied to a well region of memory cells on which the erase operation is to be performed. In still another example, a read voltage generated in a read operation may be applied to a word line of memory cells for which the read operation is to be performed.

The control logic 160 may control overall operation of the nonvolatile memory device 100, based on control signals provided from the external device. For example, the control logic 160 may control operations of the nonvolatile memory device 100 such as read, write, and erase operations of the nonvolatile memory device 100.

The above described embodiments of the present invention are intended to provide a thorough understanding of the invention, not to limit it. Various alternatives and equivalents are possible, as those skilled in the art will recognize in light of the present disclosure. Thus, the invention is not limited by or to any of the embodiments described herein. Nor is the invention limited to any specific type of semiconductor device. Rather, the present invention encompasses all additions, subtractions, and modifications to the extent they fall within the scope of the appended claims.

What is claimed is:

1. An operating method of a controller which controls a memory system including a nonvolatile memory device including a plurality of data storage regions the method comprising:
   receiving a command from a host;

determining whether a pre-condition command is included in the command by confirming whether the received command has a reserved area; and switching the memory system to a pre-condition state by performing a secure erase and patterning on the nonvolatile memory device according to the pre-condition command included in the command.

2. The method of claim 1, wherein, when the received command is for executing the secure erase, the pre-condition command is executed in preference to other commands received from the host.

3. The method of claim 2, wherein the received command is a command word 11 according to a nonvolatile memory express (NVMe) standard.

4. The method of claim 1, wherein the switching to the pre-condition state includes performing an operation which disables a performance improvement function for improving performance of a read operation or a write operation of the memory system.

5. The method of claim 4, wherein the performance improvement function includes a memory cache function for improving the performance of the write operation and a cache policy for improving the performance of the read operation.

6. The method of claim 1,
wherein the patterning is performed after the secure erase is performed, and
wherein the patterning includes performing a sequential write operation or a random write operation.

7. The method of claim 6, wherein the sequential operation or the random write operation is performed through a write operation according to a burst mode.

8. The method of claim 1, wherein the reserved area of the command further includes information on whether the patterning is a sequential write or a random write, a size of a data storage region on which the write operation for the patterning is to be performed, and information for enable/disable of a performance improvement function of the memory system.

9. A memory system comprising:
a nonvolatile memory device including a plurality of data storage regions; and
a controller configured to control the nonvolatile memory device,
wherein the controller determines whether a pre-condition command is included in a received command by confirming whether the received command has a reserved area, and
wherein the nonvolatile memory device performs a secure erase and patterning according to the pre-condition command included in the command.

10. The memory system of claim 9, wherein, when the received command is for executing the secure erase, the controller controls the nonvolatile memory device to execute the pre-condition command in preference to other commands received from the host.

11. The memory system of claim 10, wherein the received command is a command word 11 according to a nonvolatile memory express (NVMe) standard.

12. The memory system of claim 9, wherein the controller disables a performance improvement function for improving performance of a read operation or a write operation of the memory system.

13. The memory system of claim 12, wherein the performance improvement function is a memory cache function for improving the performance of the write operation and a cache policy for improving the performance of the read operation.

14. The memory system of claim 9,
wherein the nonvolatile memory device performs the patterning after the secure erase is performed, and
wherein the patterning includes performing a sequential write operation or a random write operation.

15. The memory system of claim 14, wherein the sequential write operation or the random write operation is performed through a write operation according to a burst mode.

16. The memory system of claim 9, wherein the reserved area of the command further includes information on whether the patterning is a sequential write or a random write, a size of a data storage region on which the write operation for the patterning is to be performed, and information for enable/disable of a performance improvement function of the memory system.

17. An operating method of a controller for controlling a memory device having a plurality of memory blocks, the operating method comprising:
controlling, in response to a pre-condition command, the memory device to:
erase all of the memory blocks; and
store patterns of test data in a storage region, having a size indicated by the pre-condition command, within the memory blocks; and
controlling, in response to a test command, the memory device to perform a read operation on the memory blocks storing the patterns of test data.

* * * * *